United States Patent
Ross et al.

(10) Patent No.: US 11,090,584 B2
(45) Date of Patent: Aug. 17, 2021

(54) GAS-TIGHT CENTRIFUGE FOR VOC SEPARATION

(71) Applicant: RECOVER ENERGY SERVICES INC., Calgary (CA)

(72) Inventors: Stan Ross, Cochrane (CA); Paul Sudlow, Calgary (CA)

(73) Assignee: RECOVER ENERGY SERVICES INC., Calgary (CA)

( * ) Notice: Subject to any disclaimer, the term of this patent is extended or adjusted under 35 U.S.C. 154(b) by 695 days.

(21) Appl. No.: 15/743,155

(22) PCT Filed: Aug. 23, 2016

(86) PCT No.: PCT/IB2016/055033
§ 371 (c)(1),
(2) Date: Jan. 9, 2018

(87) PCT Pub. No.: WO2017/037569
PCT Pub. Date: Mar. 9, 2017

(65) Prior Publication Data
US 2018/0207554 A1      Jul. 26, 2018

Related U.S. Application Data

(60) Provisional application No. 62/212,754, filed on Sep. 1, 2015.

(51) Int. Cl.
*B01D 21/26* (2006.01)
*E21B 21/06* (2006.01)
*B04B 1/20* (2006.01)

(52) U.S. Cl.
CPC .......... *B01D 21/262* (2013.01); *E21B 21/065* (2013.01); *B01D 2257/708* (2013.01); *B04B 1/20* (2013.01)

(58) Field of Classification Search
CPC ............ B01D 21/262; B01D 2257/708; E21B 21/065; B04B 1/20
USPC ............................................... 494/39, 66, 82
See application file for complete search history.

(56) References Cited

U.S. PATENT DOCUMENTS 3,228,592 A    1/1966  Shapiro
4,120,447 A   10/1978  Jaeger
(Continued)

FOREIGN PATENT DOCUMENTS

GB    2094676    9/1982
WO    91/08375   6/1991
(Continued)

OTHER PUBLICATIONS

Svarovsky, "Solid-liquid separation", 3rd Edition, 1990, p. 277-278.
(Continued)

*Primary Examiner* — Walter D. Griffin
*Assistant Examiner* — Shuyi S. Liu
(74) *Attorney, Agent, or Firm* — Greenblum & Bernstein, P.L.C.

(57) ABSTRACT

Gas-tight decanter centrifuge process for separation of volatile organic compounds from drilling fluid. A method is described for removing low gravity solids from a mixture of recovered oil based drilling fluid and low gravity solids and diluent. A gas-tight decanter centrifuge that is designed and constructed for this purpose in a gas-tight manor so to ensure vapour cannot escape the decanting process, and foreign oxygen cannot enter the process under normal operating conditions.

16 Claims, 10 Drawing Sheets

(56) References Cited

U.S. PATENT DOCUMENTS

| | | | |
|---|---|---|---|
| 4,139,462 | A | 2/1979 | Sample, Jr. |
| 4,167,243 | A | 9/1979 | Jackson |
| 4,606,774 | A | 8/1986 | Morris |
| 5,053,082 | A | 10/1991 | Flanigan |
| 5,080,721 | A | 1/1992 | Flanigan |
| 5,256,289 | A | 10/1993 | Cope et al. |
| 6,550,552 | B1 | 4/2003 | Pappa et al. |
| 6,763,605 | B2 | 7/2004 | Reddoch |
| 9,015,959 | B2 | 4/2015 | Pomerleau |

FOREIGN PATENT DOCUMENTS

| | | |
|---|---|---|
| WO | 92/05877 | 4/1992 |
| WO | 03/102359 | 12/2003 |

OTHER PUBLICATIONS

Jaeger, "Hermetically sealed solid bowl decanter, a part of solvent chemistry", Solids/liquids separation practice and the influence of new techniques: Symposium: Papers and programme, vol. paper 5, 1984, pp.

J. Lindley "User Guide for the Safe Operation of Centrifuges" Sec 4.2 p. 7-10.

W.G. Hammond "Inert Gas Protection of Centrifuges" Lecture at the annual meeting of procedural engineers in Bayreuth, Sep. 30 to Oct. 2, 1969.

Eugene B. Price "Safe Handling of Solvents in Centrifuge Operations" Lecture at the Symposium of Fine Chemical Plants 158$^{th}$ ACS Meeting in New York, N.Y., Sep. 7 to Sep. 12, 1969.

"Alfa-Laval sales manual for separation equipment in the chemical processing industries" Product Information Ref.:. 4.E., Jan. 1975.

Fig. 8A
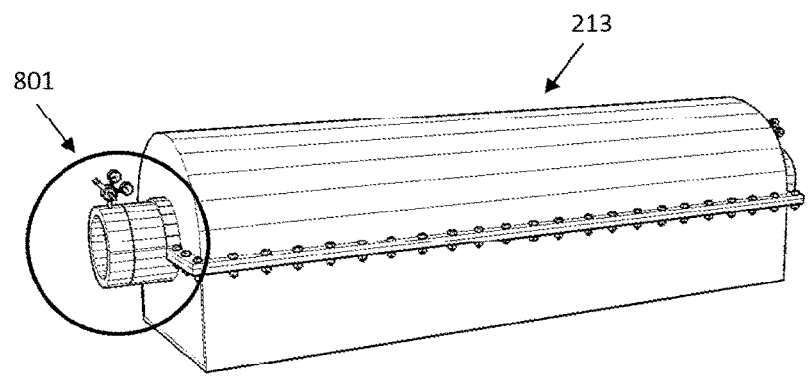
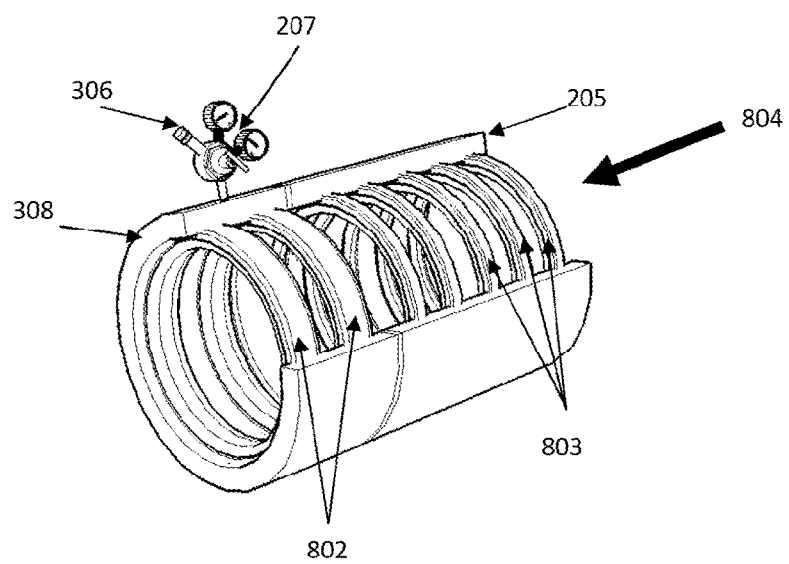
Fig. 8B

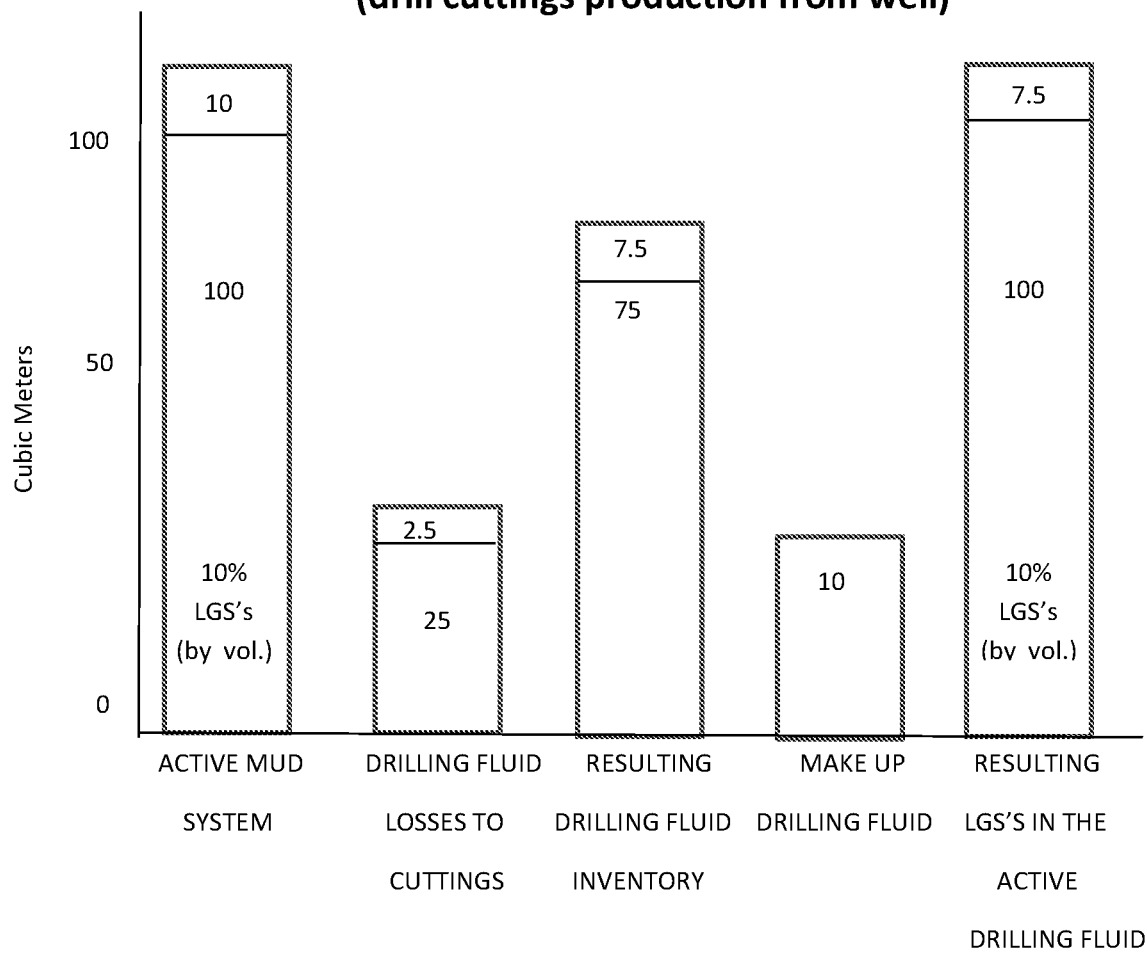

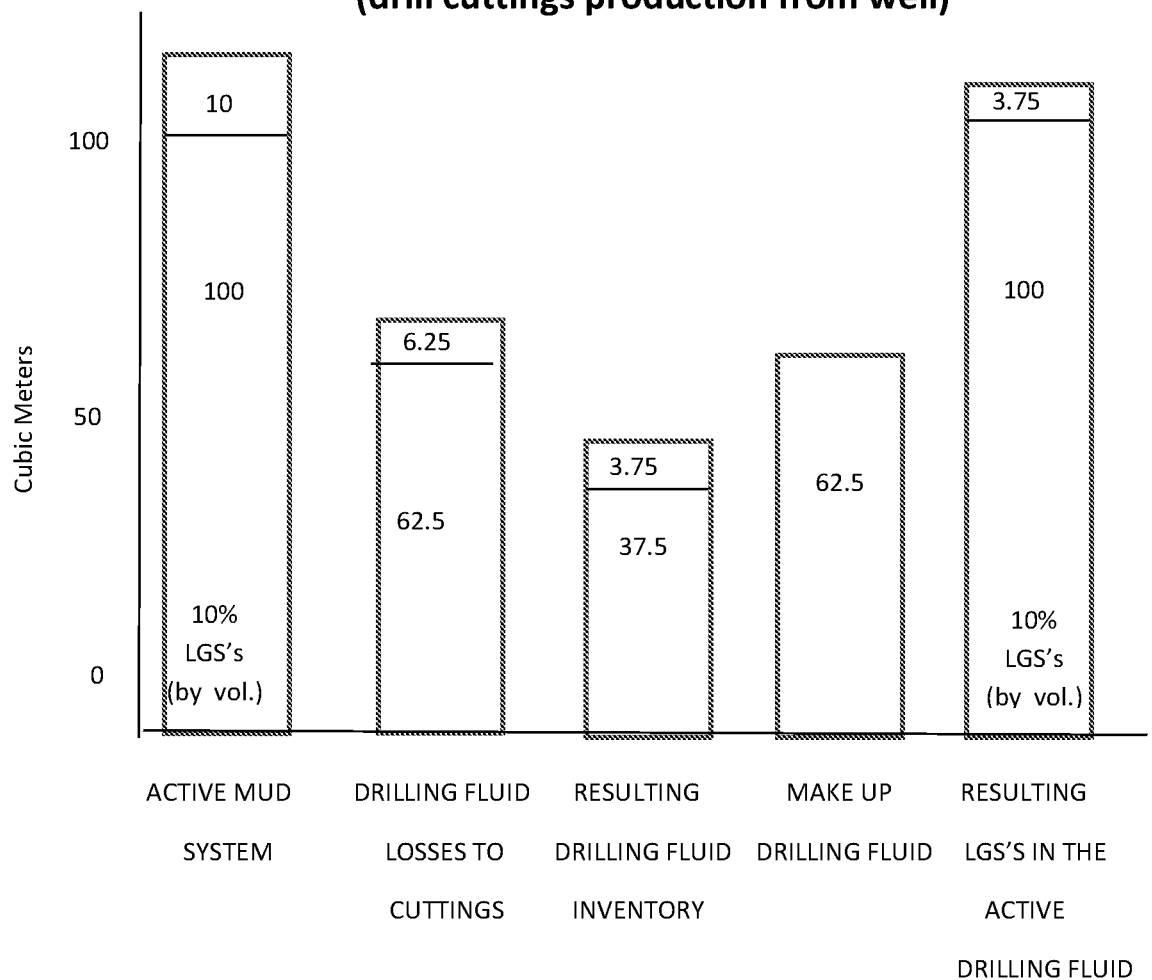

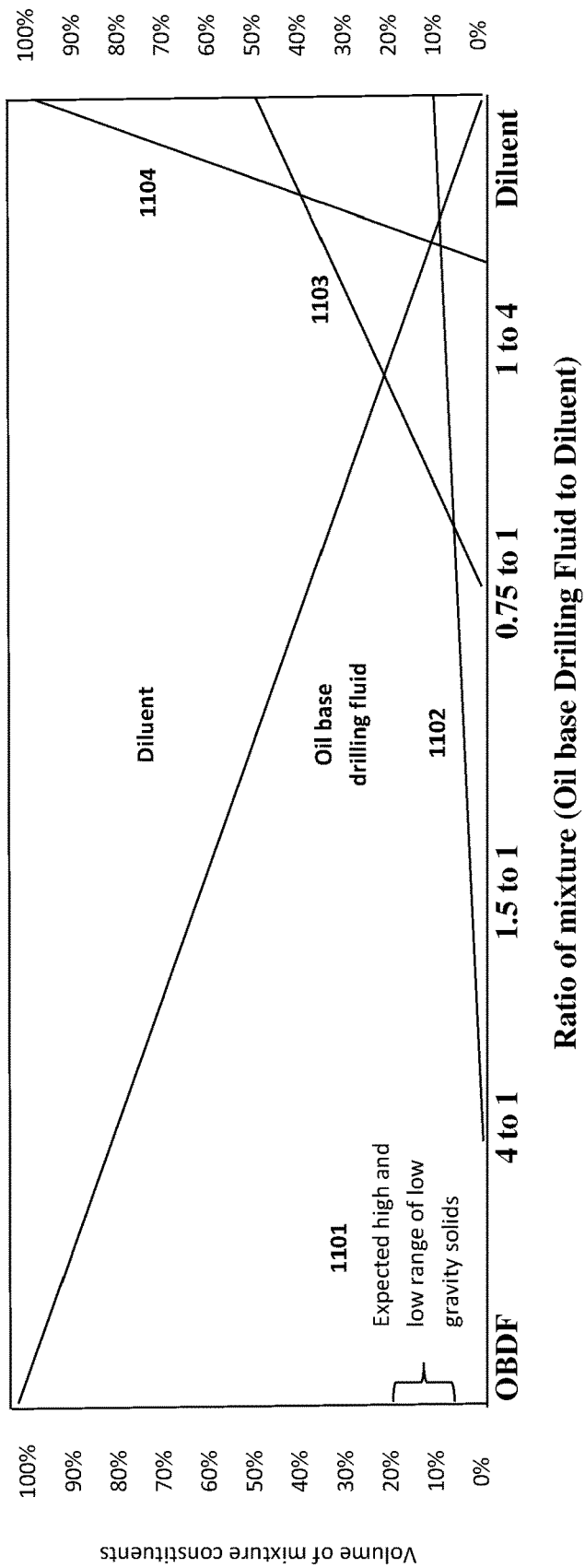

GAS-TIGHT CENTRIFUGE FOR VOC SEPARATION

CROSS-REFERENCE TO RELATED APPLICATION

The instant application claims priority to U.S. Provisional Application No. 62/212,754, filed Sep. 1, 2015, the disclosure of which is incorporated by reference herein in its entirety.

TECHNICAL FIELD

The field of art to which this invention generally pertains is the processing of drilling waste.

BACKGROUND

During the drilling of a well, for example for gas or oil, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil based or brine based drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through mechanical means, and this residual drilling mud is considered to be contamination.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then typically transported to a secure landfill where they are stored for an indeterminate period of time, typically generations.

The recovered drilling fluids that have been subjected to solids separating devices, such as that of shale shakers or decanter centrifuges still contain residual amounts of small micron sized solids, otherwise known as Low Gravity Solids or Ultra Fines.

The accumulation of Low Gravity Solids in an active drilling mud system is of significant concern to drilling well operators because they contribute to increased wear of high volume circulating equipment, they can cause the drill string to become differentially stuck in porous formations leading to expensive drilling downtime, and they contribute to reduced rates of drilling penetration, commonly known by those in the industry as the Rate of Penetration or ROP.

With the evolution of new drilling technologies such as horizontal drilling, shale oil or shale gas fracking, and the increasing cost of drilling fluids, the ability to, and benefits of, enhancing drilling fluid to its new or original condition, is increasing.

Accordingly, there is a constant search for new technologies and improvements to existing technologies to increase the efficiency and effectiveness of reclaiming processes.

BRIEF SUMMARY

A method of removing low gravity solids from recovered oil based drilling fluid is described including mixing the low gravity solids containing drilling fluid with a diluent, and processing the mixture in a gas-tight decanter centrifuge to produce effluent and separated low gravity solids, wherein the centrifuge is sealed so as to prevent escape of vapors from the mixture into the atmosphere and the introduction of atmospheric oxygen into the gas-tight decanter centrifuge.

Additional embodiments include: the method described above where the diluent has a vapour pressure between about 0.1 Torr and about 760 Torr when measured at 20° C.; the method described above where the diluent has a flash point less than or equal to 37° C.; the method described above where the diluent has a vapour pressure between about 0.1 Torr and about 760 Torr when measured at 20° C., and a flash point less than or equal to 37° C.; the method described above where the processing is run at an internal pressure of up to about 760 Torr when measured at 20° C.; the method described above where the mixture has a vapour pressure equal to or greater than 0.1 Torr and less than 760 Torr and the mixture has a flash point equal to or less than 37° C.; the method described above where the diluent and the recovered oil based drilling fluid are blended prior to introduction into the gas-tight decanter centrifuge; the method described above where the diluent and the recovered oil based drilling fluid are blended in a chemical wash processing tank prior to introduction into the gas-tight decanter centrifuge; the method described above where the diluent and the recovered oil based drilling fluid are blended in a manifold prior to introduction into the gas-tight decanter centrifuge; the method described above where the oil based drilling fluid containing low gravity solids has been recovered by a solids control process, and diluent is added to achieve low gravity solids removal in a gas-tight decanter centrifuge; the method described above where the oil based drilling fluid, low gravity solids and diluent is introduced into the gas-tight decanter centrifuge at a controlled rate and the gas-tight decanter centrifuge is operated at less than its designed hydraulic loading capacity so as to produce less than 1% by volume low gravity solids in the effluent; the method described above where the diluent and recovered oil based drilling fluid containing low gravity solids are at any level of homogeneity or uniformity as the mixture is moved into the gas-tight centrifuge.

A decanting process is also described for removing low gravity solids from a mixture of recovered oil based drilling fluid containing low gravity solids and a volatile organic compound containing diluent in a gas-tight decanter centrifuge that is designed and constructed in a gas-tight manor so to ensure transient volatile organic compounds cannot escape the decanting process, foreign oxygen cannot enter the process under normal operating conditions, including where the gas-tight decanter centrifuge is connected to at least one additional process so to allow the sharing of a common non-combustible or inert atmosphere with said at least one additional process; the method described above where the additional process is one or more of a solids drying, solids washing, distillation and/or filtration process.

Additional embodiments include, the method described above additionally containing a solids discharge outlet which includes a sealable gas-tight connection to a semi-rigid bellows or flexible conduit which leads to a conveyor (for example, auger, pump, belt conveyor, etc.) so that the recovered low gravity solids can be evacuated to at least one additional process while simultaneously allowing for vibration isolation from the gas-tight decanter centrifuge to said at least one additional process, or from said at least one additional process to the gas-tight decanter centrifuge, and fluid flow communication of the common inert atmosphere; the method described above additionally containing a liquids discharge outlet which includes a sealable gas-tight connection to a semi-rigid bellows or flexible conduit which allows for vibration isolation between the gas-tight decanter centrifuge to the at least one additional process or from the at least one additional process to the gas-tight decanter centrifuge, and fluid flow communication between the recovered liquids and a pump inlet or holding tank.

BRIEF DESCRIPTION OF THE DRAWINGS

FIGS. 8A and 8B are a depiction of a shaft sealing assembly and inert gas shaft assembly and a seal arrangement.

FIGS. 9 and 10 depict how dilution of oil based drilling fluid has been used to reduce the low gravity drilled solids FIG. 11 is an illustration showing the predicted effects of g-force separation on a mixture of diluent, oil based drilling fluid and low gravity solids, at different feed rates, relative to the hydraulic capacity of the gas-tight decanter centrifuge.

DETAILED DESCRIPTION

Figure 1:
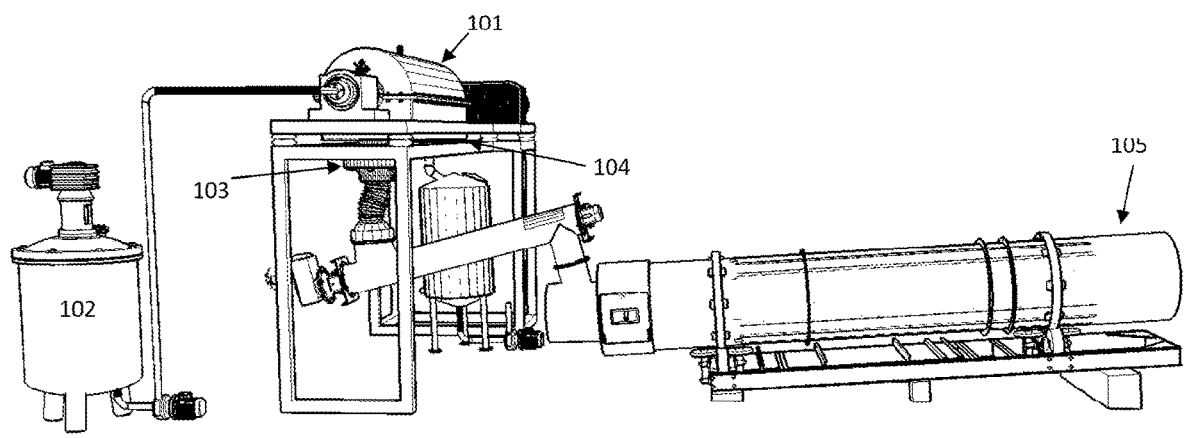
FIG. 1 is a representation of a typical gas-tight decanter and additional processes.
Figure 2:
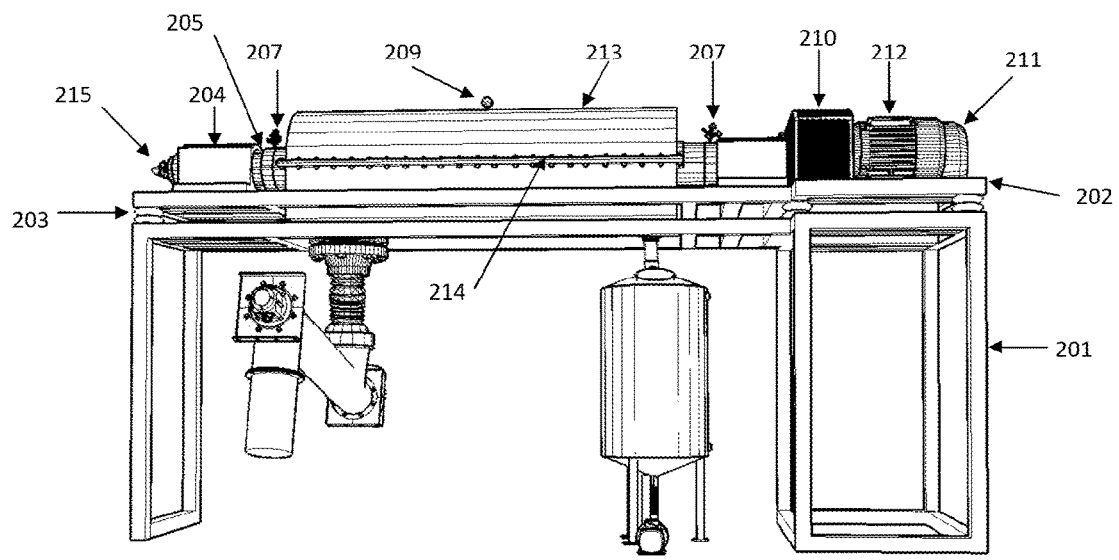
FIG. 2 is a detailed representation of a gas-tight decanter configuration.
Figure 3:
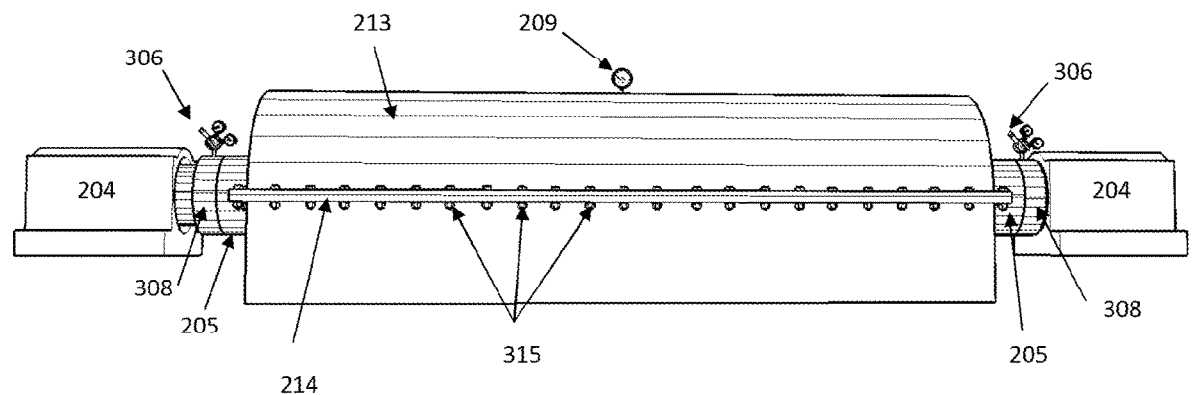
FIG. 3 is a detailed representation of a gas-tight decanter casket and sealing sections.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

A method to enhance the quality of oil based drilling fluid following the recovery of the fluid from an oil based drill cuttings treatment system is described.

As stated above, a process of removing undesirable low gravity solids from an oil based drilling fluid is described herein, where the drilling fluid has previously been recovered through a separate recovery process, by adding a diluent that offers the desirable characteristics of solubility with the drilling fluid and the ability to alter the viscosity, thereby giving the mixture an enhanced ability to release the undesirable low gravity solids from the mixture within a gas-tight decanter centrifuge. The method described above introduces a blend of oil base drilling fluid containing low gravity solids and diluent into the centrifuge and the centrifuge is operated at less than its designed hydraulic loading capacity so as to produce less than 1% by volume low gravity solids in the effluent. The recovered oil based drilling fluid containing low gravity solids and diluent is at any level of homogeneity or uniformity as the mixture is moved into the gas-tight centrifuge, i.e., it does not have to be uniformly distributed in the recovered mud. The centrifuge is of a sealed design with an inert gas blanket added to ensure oxygen cannot be introduced to the gas-tight area and thereby create a combustible gas mixture.

The method described demonstrates how an otherwise volatile diluent can be safely added to the oil based drilling fluid prior to centrifugation, thereby resulting in an excellent, if not perfect, removal of undesired suspended solids, within a gas-tight centrifuge. For the purposes of understanding general terms used herein, the Metric system has been used for consistent units of measurement, unless specifically cited as another, except for measurements in "Torr", which is not specific to either the Imperial or Metric systems. Any reference to pressure reflects gauge pressure, not absolute pressure.

Use of the term "mixture" is done to simplify the language within, when referencing a fluid comprised of a diluent, oil based drilling fluid and low gravity solids, in any portion of any three within the whole volume of the mixture.

In an effort to make the language more understandable, the terms "Viscosity" and "Rheology" are provided as follows; Viscosity is best understood as the thickness of a fluid. For example, water is not very viscus whereas a milkshake is typically, very viscus. Rheology is best understood as the "Yield Point" of the fluid, or the carrying capacity of the fluid. A marble dropped in a glass of water will demonstrate a fluid with a very low yield, because the marble drops quickly. The same marble in a milkshake will drop slower because of the higher yield of the fluid.

Drill cuttings are generated by the drill bit breaking underground formations apart to reach a depth where valuable hydrocarbons can be extracted during the production of the well. Oil based drilling fluids are continually circulated through the drill string to move drill cuttings up the well bore, which are subsequently removed by surface solids control equipment, like that of conventional shale shakers or centrifuges.

Generally, it would be the opinion of most drilling hands that optimum drilling results are obtained from a light weight fluid, which increases the rate of penetration of the drill bit. Water is used as the base for drilling fluid in areas where there is a concern of encountering ground water or aquifers, and there is little or no concern of drilling through fragile shales. Generally speaking, water is also a very inexpensive drilling fluid because the base product is abundantly available.

Oil based drilling fluids have seen significantly higher usage over time because not only are they 10% lighter than water, but oil does not damage fragile shales; fragile shales are also known as hydrophobic shales. Hole stability is an important consideration for drilling operators because if the well bore is sluffing or swelling, due to drilling fluid damage, the drill string may become unmoveable, and need to be cemented in place within the wellbore. Plugging a well can cost millions of dollars because the drilling operator will either need to directionally drill past the cement plug or, re-drill the well from top to bottom from an alternate surface location. Hole stability considerations are almost entirely removed from thought with the use of oil based drilling fluid.

Given that hole stability is greatly improved with oil based drilling fluids, over water based drilling fluids, drilling operators can focus on drilling efficiencies, for example, drilling the well in as few days as possible, or better onsite practices or efficiencies, either of which would likely result in lower drilling costs.

Examples of onsite efficiencies have been enhancing the recovery of valuable oil based drilling fluids through improved surface solids control equipment. However, improving the onsite recovery of valuable oil based drilling fluids have only been semi-productive, at best.

One such example of a drilling efficiency is proposed in U.S. Pat. No. 9,015,959 wherein negative air pressure is applied to a shale shaker to remove additional drilling fluid from the drill cutting particles. Generally, the negative air pressure shale shaker screen can recover about ⅓ more drilling fluid than conventional shale shakers. When compared to conventional shale shaker technology, the art described is obviously better, but it is still very limited in its capabilities. Further, the negative air pressure shale shaker screen can only remove excess wetness from solids that would otherwise travel over the shaker screen (regardless of the negative air pressure enhancement); this design cannot remove low gravity drilled solids within the drilling fluid because the low gravity drilled solids are typically less than 5 microns in size and the typical range of screen sizes used while drilling a well is greater than 37 microns (400 mesh screen) and less than 98 microns (210 mesh screen); anything equal to or less than about 37 microns will travel freely through even the tighter range of shaker screens. In fact, it's important to note that additional drilling fluids recovery with the vacuum screen will add to the problem of low gravity drilled solids because it reduces the amount of new make-up volume added to the active drilling fluid system which dilutes the total low gravity drilled solids within the active drilling fluid system. See, for example, Table 1 below and FIGS. 9 and 10 which demonstrate the positive effects of dilution on an active drilling fluids system, and it is further explained below.

Other drilling fluids recovery processes are described in International Publication Number WO 03/102359 and U.S. Pat. Nos. 5,256,289 and 6,763,605, for example, where a vertical centrifugal screen is employed to recover drilling fluid by exerting moderate gravitational forces on the solids, resulting in the removal of about 65% of the drilling fluid previously lost with the drill cuttings. However, the drilling fluid recovered through the use of a vertical centrifugal screen (commonly referred to as a Verti-G in the industry) is highly polluted in both low and high gravity solids. This pollution is caused by a scrapper pulling the drill cuttings down a screen that is otherwise holding the fragile drill cuttings against the screen with about 400 gravitational (G) forces, thereby degrading the larger particle sizes into smaller particle sizes. Substantial and invasive drilling fluids rehabilitation must be conducted to remove the sharp increase in solids now suspended in the recovered drilling fluid. An example of 'substantial' or 'invasive' rehabilitation includes heating the recovered oil based drilling fluid up to greater than 100° C. to artificially reduce the viscosity of the fluid, prior to atmospheric centrifugation at very high forces, for example, typically between 2,500 and 3,000 gravitational forces. Further, the feed pump is slowed substantially so that the feed rate is well below an otherwise typical flow rate, thereby increasing the retention time the polluted drilling fluid spends within the bowl, under the extreme gravitational forces. Further, the weirs are set to a maximum liquids clarity within a conventional decanter centrifuge in a further effort to reduce the low gravity drilled solids.

FIG. 11 is an illustration showing the predicted effects of g-force separation on a mixture of diluent, oil based drilling fluid and low gravity solids, at different pump feed rates, relative to the hydraulic capacity of the gas-tight decanter centrifuge. As can be seen from the figure, the expected actual high and low range of low gravity solids is indicated (1101) on the lower left hand side of the figure (approximately 5% to 20% by volume). The data in the figure assumes the solids are in uniform suspension. What the figure demonstrates is that for various ratios of oil based drilling fluid to diluent, the degree of capacity the centrifuge would be run at, to get down to basically 0% solids (i.e., less than 1% by volume) in the treated drilling fluid. The rate of addition of diluent in the centrifuge is a measure of volume. For example, as shown in the figure, for a drilling fluid containing a 4 to 1 volume ratio of oil based drilling fluid to diluent (1102), the centrifuge would have to be run at approximately 10% of its hydraulic capacity to remove basically all of the low gravity solids, whereas for a drilling fluid containing a 0.75 to 1 ratio of oil based drilling fluid to diluent (1103), the centrifuge would have to be run at approximately 50% of its hydraulic capacity to remove basically all of the low gravity solids, and finally, for a drilling fluid containing a 1 to 4 ratio of oil based drilling fluid to diluent (1104), the centrifuge could be run at approximately 100% of its hydraulic capacity to remove basically all of the low gravity solids. The capacity that the centrifuge is run at will be at whatever capacity is required to generate less than 1% low gravity solids in the effluent.

FIG. 1 demonstrates a typical gas-tight process as described herein. The gas-tight centrifuge (101) is connected to a gas-tight centrifuge feed (102). Solids are removed from the centrifuge through a gas-tight solids outlet flange (103) and liquids through a gas-tight liquids outlet flange (104). As shown here, the solids pass onto a solids dryer, kiln, or evaporator (105).

The method described above additionally contains a liquids discharge outlet which includes a sealable gas-tight connection (702) to a semi-rigid bellows or flexible conduit (703) which allows for vibration isolation between the centrifuge (101) to the at least one additional process (105 or 704/705) or from the at least one additional process (102) to the centrifuge (101), and fluid flow communication between the recovered liquids (any of the effluent coming off the centrifuge, which would include diluent and the less than 1% low gravity solids and oil base mud) and a pump (705) inlet or holding tank (704). The effluent typically would not go directly into distillation, but most likely into a holding tank (704) first, just to manage the process. This storage tank can be just under the centrifuge, but in any case would be a connected process. With less than 1% low gravity solids in the effluent, it can go into a holding tank (704), to distill when ready. Typically a pump (705) would it carry it away, including pump right off of centrifuge as well—it is all an air-tight, connected process is what's important.

As mentioned above, the best rates of penetration are achieved when drilling with a light weight drilling fluid. New oil based drilling fluid is very light because it hasn't had time to become polluted with significant amounts of drilled solids and therefore, the best fluid to use to achieve high penetration rates. However, due to the high cost of oil based drilling fluid, it must be recirculated and reused as many times as possible to maximize the investment. The continual reuse of the fluid is where the problem begins; with each full circulation, low gravity drilled solids begin to accumulate in the drilling fluid, and given the viscosity and rheology of the fluid, they are impossible for conventional solids control equipment to effectively remove the ever increasing, smaller micron sized particles. However, a semi-sustainable solution comes about through the lack of good quality drill cuttings remediation equipment. Because the drill cuttings ejected through the use of conventional solids control equipment are of limited efficiency, there has continually been losses of oil based drilling fluid to the drill cuttings, thereby requiring new make-up oil based drilling fluid be added to the active drilling fluid system. This new make-up oil based drilling fluid has helped to reduce the low gravity drilled solids burden through simple dilution. For example, it would not be uncommon for the drilling of a well to produce 100 to 250 cubic meters of oil contaminated drill cuttings, with an average wetness of 25% (by volume), drilling fluid on cuttings. It would be common for the drilling operation to have an inventory of 100 cubic meters of oil based drilling fluid in the active mud system, so one could reasonably expect 25 to 62.5 cubic meters of oil based drilling fluid losses on drill cuttings, per well. The loss of this drilling fluid also means a loss of a proportional amount of low gravity drilled solids.

Generally, it is considered an excellent drilling practice to keep low gravity drilled solids at equal to or less than 5% (by volume) within an active oil based drilling fluid; with equal to or less than 9% (by volume) being within acceptable tolerances; and greater than or equal to about 10% being considered extremely high and ideally, in need of correction. The data shown in Table 1 below is also reflected graphically in FIGS. 9 and 10.

TABLE 1

| Low Case | Units | | High Case | Units |
|---|---|---|---|---|
| 100 | cubic meters | Cuttings production per well | 250 | cubic meters |
| 25 | % by volume | Average wetness of drill cuttings | 25 | % by volume |
| 100 | cubic meters | Active drilling fluid system volume | 100 | cubic meters |
| Infinite | | Oil based drilling fluid available | Infinite | |
| 10 | % by volume | Low gravity solids in the active drilling fluid | 10 | % by volume |
| 25 | cubic meters | Oil based drilling fluid lost to cuttings | 62.5 | cubic meters |
| 75 | cubic meters | Remaining oil based drilling fluid in the active drilling fluid system | 37.5 | cubic meters |
| 7.5 | % by volume | Low gravity solids in the remaining active drilling fluid system | 3.75 | % by volume |
| 25 | cubic meters | New make-up drilling fluid added to the active drilling fluid system | 62.5 | cubic meters |
| 0 | % by volume | Low gravity solids in the new drilling fluid (pre-addition) | 0 | % by volume |
| 7.5 | % by volume | Resulting low gravity solids in the active drilling fluid system | 3.75 | % by volume |
| Low gravity solids reduced by 25% | | Improvement or impairment of the active drilling fluid system | Low gravity solids reduced by greater than 60% | |

Figure 12:
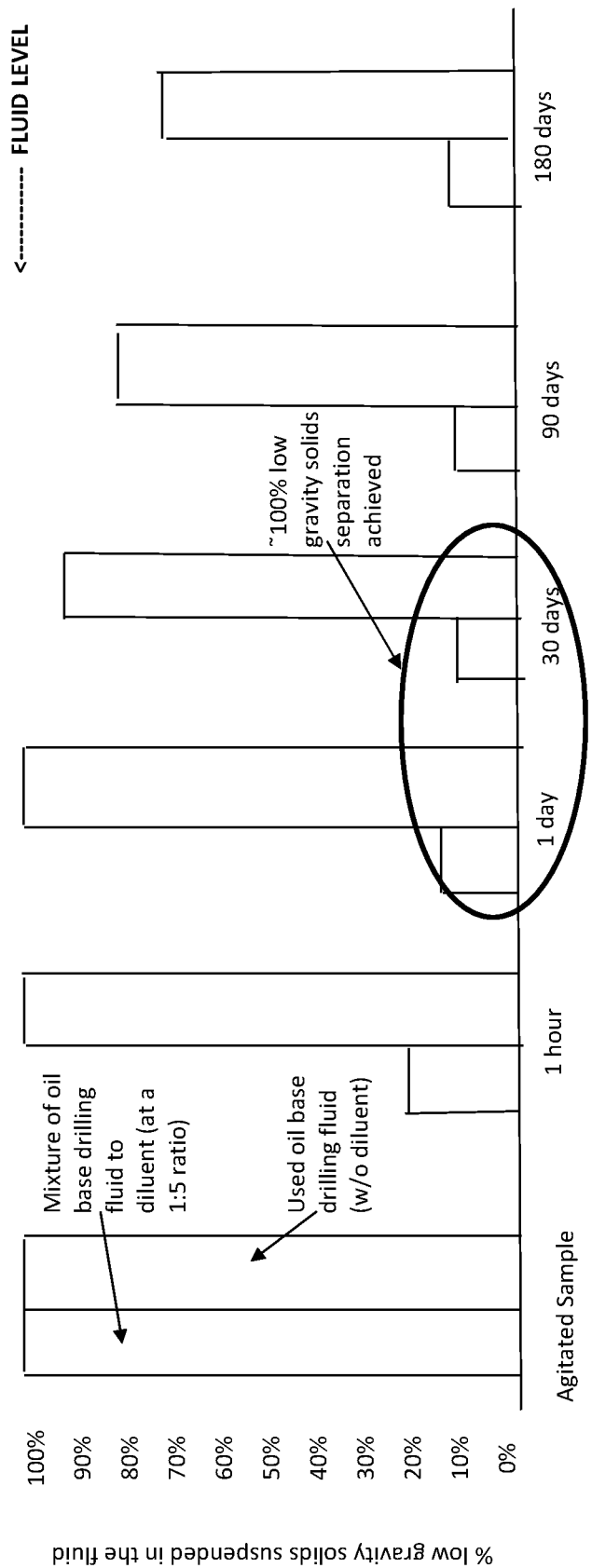
FIG. 12 is an illustration showing the effectiveness of even a single gravitational force of separation on an oil based drilling fluid and diluent, mixed at a ratio of 5:1 respectively, versus a used oil based drilling fluid held in storage.

To present a perspective of how difficult it can be to remove low gravity drilled solids, see Table 2 which shows estimated settling velocity for low gravity solids in oil based drilling fluid, when stored in a static, un-agitated state. Over a six month time period, while the drilling fluid is in storage, one could expect only a minuet portion of the low gravity drilled solids to settle (FIG. 12).

With the advent of ever increasing recycling initiatives for oil based drilling fluids and drill cuttings, so too is the need for improved drilling fluids rehabilitation. The usefulness of diluent added to an oil based drilling fluid to reduce the viscosity and rheology, thereby allowing the separation of low gravity drilled solids within the mixture to occur, is demonstrated herein. FIG. 11 further expresses the enhanced separation of low gravity drilled solids when a diluent is mixed with an oil based drilling fluid at a ratio of 5:1 (diluent to oil based drilling fluid and low gravity solids). As shown in FIG. 12, testing has shown that even disproportionately high amounts of low gravity solids can be removed when a single gravitational force is applied to a mixture of diluent and drilling fluid and low gravity solids. In as little as one hour, the mixture shows an excellent settlement occurring with nearly full compaction of the low gravity solids within 24 hours. For comparison, six months of settling time cannot achieve numbers remotely close to that of the diluent/oil based drilling fluid mixture.

The selection of a diluent is very important, for example, it must be soluble in the drilling fluid and it must be recoverable due to diluent cost. Typical diluents useful with the processes described herein include those diluents with a vapour pressure equal to or greater than 0.1 Torr and less than 760 Torr (corrected to 20° C.), and further, the diluent having a flash point equal to or less than 37° C. Such diluents are commonly referred to as volatile organic compounds, or VOC's.

FIG. 11 demonstrates the approximated effects of the diluent, when mixed with varying amounts oil based drilling fluids and low gravity solids. The chart shows a full concentration of diluent (on the right) and oil based drilling fluid (on the left), and the approximated effects of high gravitational forced separation at the rated hydraulic flows of most typical decanter centrifuges. Given the variety of bowl sizes, beach lengths, bowl speeds, back drive speeds and weir depths, and further, several different oil bases used for drilling fluid, FIG. 11 is expressed as an approximate effectiveness of low gravity solids removal, using the manufacturers full hydraulic flow capacity of the decanter centrifuge as its 100% flow rate. For example, when pumping a mixture of diluent, oil based drilling fluid and low gravity solids at a ratio of 5:1 respectively (1104), one can expect to feed the decanter centrifuge at 100% of its rated hydraulic flow capacity and achieve full removal of all undesired low gravity solids. If the mixture becomes more lean, for example, the ratio of the mixture changes to 0.75:1 (oil based drilling fluid and low gravity solids, to diluent) (1103), one can expect to feed the decanter centrifuge at approximately half or less, of the manufacturers maximum rated flow rate. The lower the diluent volume in the oil based drilling fluid and low gravity solids (1102), the slower the decanter centrifuge must be fed to achieve full removal of all low gravity drilled solids to a point for example, that the flow rate of the decanter centrifuge becomes uneconomical, inefficient or unpractical because without the addition of diluent, one can expect there will never be a full removal of the undesired low gravity solids.

Tables 2, 3, 4, 5 and 6 below are included to demonstrate why the addition of a diluent has the ability to remove solids from a mixture. Hexane was used as the diluent for the calculations (although, as stated below, other diluents such as n-butly alcohol, toluol, ethyl acetate, etc., or blends of diluents can be used as well).

TABLE 2

Applying Stokes' Law and Bingham Liquid Flow Model to Solid Particles in the Wash Tank and Centrifuge Wash Tank

| | | | Yield Stress (Y.P.) Pa | Plastic Viscosity (of Bingham Fluid) | | Dynamic Viscosity (of liquids) kg/m-s | density (of fluid) |
|---|---|---|---|---|---|---|---|
| | | | N/m^2 | mPa-s | Pa-s | Pa-s | kg/m^3 |
| density of particles | 1500 kg/m^3 | Fluid | | | | | |
| external force on particle | 1.0 × Gravity | hexane | 0 | n/a | | 0.000297 | 667 |
| diameter of particle | 5 micron | oil based mud | 4.5 | 16 | 0.016 | 0.002000 | 1212 |
| | 5.00E−06 m | 5 to 1 volume ratio hexane/mud mixture | 0 | n/a | | 0.000437 | 758 |

| | | setting velocity | | Will solids separate? (by overcoming the yield stress) | Reynold's Number (Re) | Approx. Error in Velocity Calculation? |
|---|---|---|---|---|---|---|
| | | m/s | m/minute | | | |
| density of particles | 1500 kg/m^3 | | | | | |
| external force on particle | 1.0 × Gravity | 0.000038 | 0.0023 | yes, they will | 0.0004 | less than 2% |
| diameter of particle | 5 micron | 0.000000 | 0.0000 | no, they won't | 0.0000 | less than 2% |
| | 5.00E−06 m | 0.000023 | 0.0014 | yes, they will | 0.0002 | less than 2% |

TABLE 2-continued

Applying Stokes' Law and Bingham Liquid Flow Model to Solid Particles in the Wash Tank and Centrifuge Centrifuge

|  |  |  | Yield Stress (Y.P.) Pa | Plastic Viscosity (of Bingham Fluid) | | Dynamic Viscosity (of liquids) kg/m-s | density (of fluid) |
| --- | --- | --- | --- | --- | --- | --- | --- |
| density of particles | 1500 kg/m^3 | Fluid | N/m^2 | mPa-s | Pa-s | Pa-s | kg/m^3 |
| external force on particle | 1750.0 × Gravity | hexane | 0 | n/a |  | 0.000297 | 667 |
| diameter of particle | 5 micron | oil based mud | 4.5 | 16 | 0.016 | 0.002000 | 1212 |
|  | 5.00E−06 m | 5 to 1 volume ratio hexane/mud mixture | 0 | n/a |  | 0.000437 | 758 |

|  |  |  | setting velocity | | Will solids separate? (by overcoming the yield stress) | Reynold's Number (Re) | Accuracy of in velocity Calculation? |
| --- | --- | --- | --- | --- | --- | --- | --- |
| density of particles | 1500 kg/m^3 |  | m/s | m/minute |  |  |  |
| external force on particle | 1750.0 × Gravity |  | 0.066875 | 4.0125 | yes, they will | 0.7509 | less than 2% |
| diameter of particle | 5 micron |  | 0.000000 | 0.0000 | no, they won't | 0.0000 | less than 2% |
|  | 5.00E−06 m |  | 0.040537 | 2.4322 | yes, they will | 0.3519 | less than 2% |

Stokes' Law holds in streamine flow (Reynold's number less than 2)
Stokes' Law holds whare particles are unaffected by the motion of other particles. (E.g.: If large particles fall quickly past small particles, or if bubbles are rising, then the result is affected.)
Refutas Equation used to derive the dynamic viscosity of the OBM/Hexane mixture.
Mud assumed to follow the Bingham Plastic Model for non-newtonian, shear thinning liquids with a linear shear stress/shear strain relationship and a yield stress >0.
Hexane assumed to be a newtonian fluid.
Hexane - OBM mixture assumed to be a newtonian fluid.
Particles assumed to to be spherical

TABLE 3

Calculating Dynamic Viscosity of mixture:

| kinematic viscosity | | Viscosity Blending No. Refutas Equation | Mass Fraction | Mass Ratio | kinematic viscosity of mixture | | dynamic viscosity of mixture kg/(m-s) | Force of Gravity (positive is down) | Force of Shear at Yield | Will solids separate? |
| --- | --- | --- | --- | --- | --- | --- | --- | --- | --- | --- |
| m^2/s | cSt |  |  |  | cSt | m^2/s | Pa-s | N | N |  |
| 4.45277E−07 | 0.445277 | −11.07378842 | 0.7335 | 2.7517 |  |  |  | 5.35E−13 | 0.00E+00 | yes, they will |
| 1.65017E−06 | 1.650165 | 9.38147087 | 0.2665 | 1.0000 |  |  |  | 1.85E−13 | 3.53E−10 | no, they won't |
| 5.76041E−07 | 0.576041 | −5.62145188 | 1.0000 |  | 0.576040642 | 5.76041E−07 | 0.000437 | 4.77E−13 | 0.00E+00 | yes, they will |

Calculating Dynamic Viscosity of mixture:

| kinematic viscosity | | Viscosity Blending No. Refutas Equation | Mass Fraction | Mass Ratio | kinematic viscosity of mixture | | dynamic viscosity of mixture kg/(m-s) |  |  |  |
| --- | --- | --- | --- | --- | --- | --- | --- | --- | --- | --- |
| m^2/s | cSt |  |  |  | cSt | m^2/s | Pa-s | Yield |  |  |
| 4.45277E−07 | 0.445277 | −11.07378842 | 0.7335 | 2.7517 |  |  |  | 9.36E−10 | 0.00E+00 | yes, they will |
| 1.65017E−06 | 1.650165 | 9.38147087 | 0.2665 | 1.0000 |  |  |  | 3.24E−10 | 3.53E−10 | no, they won't |
| 5.76041E−07 | 0.576041 | −5.62145188 | 1.0000 |  | 0.576040642 | 5.76041E−07 | 0.000437 | 8.34E−10 | 0.00E+00 | yes, they will |

TABLE 4

| | Dynamic Viscosity Kg/(m-s) or Pa-s | Density Kg/m³ | Settling Viscosity m/s | Settling Viscosity m/minute | Reynolds Number |
|---|---|---|---|---|---|
| Diluent at 20° C. | 0.000297 | 667 | 0.0764 | 4.5857 | 0.8582 |
| OBDF at 20° C. | 0.002000 | 1212 | 0.0039 | 0.2351 | 0.0119 |
| Ratio of 3:1 at 20° C. | 0.000524 | 803 | 0.0362 | 2.1742 | 0.2778 |

TABLE 5

| | | Base Oil | Water |
|---|---|---|---|
| Ratio within invert | | 90 | 10 |
| | SG × 0.001 | Volume % | Resulting weight from volume |
| Base oil | 820 | 72 | 590.4 |
| Water | 1000 | 7.2 | 72 |
| Average density of all solids | 2750 | 20 | 550 |
| Oil base drilling fluid | 1212.4 | 100% | 1212.4 |

TABLE 6

| % invert* | % hexane | Resulting SG | Ratio of sovent/oil |
|---|---|---|---|
| 100 | 0 | 1212 | 0/1 |
| 99 | 1 | 1207 | 0.01/1 |
| 98 | 2 | 1201 | 0.02/1 |
| 97 | 3 | 1196 | 0.03/1 |
| 96 | 4 | 1191 | 0.04/1 |
| 95 | 5 | 1185 | 0.05/1 |
| 94 | 6 | 1180 | 0.06/1 |
| 93 | 7 | 1174 | 0.08/1 |
| 92 | 8 | 1169 | 0.09/1 |
| 91 | 9 | 1163 | 0.10/1 |
| 90 | 10 | 1158 | 0.11/1 |
| 85 | 15 | 1131 | 0.18/1 |
| 80 | 20 | 1103 | 0.25/1 |
| 75 | 25 | 1076 | 0.33/1 |
| 70 | 30 | 1049 | 0.43/1 |
| 67.5 | 37.5 | 1035 | 0.48/1 |
| 50.0 | 50.0 | 940 | 1.00/1 |
| 47.5 | 52.5 | 926 | 1.11/1 |
| 45.0 | 55.0 | 912 | 1.22/1 |
| 42.5 | 57.5 | 899 | 1.35/1 |
| 40.0 | 60.0 | 885 | 1.50/1 |
| 37.5 | 62.5 | 872 | 1.67/1 |
| 35.0 | 65.0 | 858 | 1.86/1 |
| 32.5 | 67.5 | 844 | 2.08/1 |
| 30.0 | 70.0 | 831 | 2.33/1 |
| 28.0 | 72.0 | 820 | 2.57/1 |
| 26.0 | 74.0 | 809 | 2.85/1 |
| 24.0 | 76.0 | 798 | 3.17/1 |
| 22.0 | 78.0 | 787 | 3.55/1 |
| 20.0 | 80.0 | 776 | 4.00/1 |
| 18.0 | 82.0 | 765 | 4.56/1 |
| 16.0 | 84.0 | 754 | 5.25/1 |

*invert used in Table 6 is considered to be a weighted, active mud system

While one would suspect the altered specific gravity of the liquids phase, compared to the solids phase, is the most significant factor in effective separation using centrifugal force. In reality, the addition of a diluent reduces both the viscosity and rheology of the oil, allowing the decanter centrifuge to take advantage of the specific gravity separation between the liquids and solids phases. However, it is important to note that the diluents selected herein are flammable, volatile organic compounds, and evaporative due to their vapour pressure and therefore, the use of a decanter centrifuge would be very dangerous and have a very high operating cost, due to lost diluent through evaporation. In particular, there are four very serious implications to separating VOC's in an otherwise uncontrolled environment (i.e., an atmospheric decanter centrifuge). In order of most serious to least serious, they are:

1—The ability for transient oxygen to pollute an otherwise inert atmosphere; This is of particular concern to operators or processes because the volatiles mentioned within this patent are flammable. If one were to imagine a process wherein the decanter centrifuge is connected to a process, thereby sharing a common atmosphere that must remain inert, it would be completely unacceptable for the connected decanter centrifuge to introduce oxygen because the outcome could be catastrophic for the process, or worse yet, catastrophic for operators in the area of the process;

2—The ability for volatile vapors to escape an otherwise inert atmosphere. As mentioned above, volatiles are typically handled in a fashion that prevents the possibility of evaporation or ignition. Despite numerous safety protocols having been established in work places over time, the possibility of an accidental (i.e. static electricity, mechanical failure, operator error, etc.) ignition source being the cause of a fire, remains a concern. Now imagine a process wherein a volatile, flammable product is being centrifuged using an atmospheric decanter centrifuge. Clearly, some of the volatiles would become airborne around the decanter centrifuge and they would linger within the work area. Given that both fuel and oxygen would be present in an atmospheric condition, the possibility of an accidental ignition source resulting in even a small, isolated flash fire could result in serious harm or death to the operator, or cause additional upstream or downstream process collapse, resulting in even greater loss. Hexane, for example, is a volatile that would fall within the vapour pressure and flashpoint limitations as described herein. Hexane is flammable in concentrations of as little as 1.1% (by volume) and as much as 7.5% (by volume);

3—A further concern is the VOC and its effects on the environment. Hexane is a neurotoxin and can have severe effects on organics in even low concentrations. For that reason, operator exposure limits in the regulatory jurisdiction of Alberta, for example, is only 50 ppm (parts per million);

4—Loss of the product diluent by evaporation; Disclosed herein are a band of diluents which contain hydrocarbons. Typically the cost of a litre or gallon of a hydrocarbon based diluent is at a minimum, comparable to the cost of an equal amount of gasoline or diesel. In short, the cost of the diluent is significant and every effort must be made to recover the diluent, if not for the reasons outlined in items 1, 2 and 3 above, then most certainly to maximize economics.

A possible configuration, for example, as disclosed in U.S. Pat. No. 4,120,447, the disclosure of which is herein incorporated by reference, includes the casket, or housing (213), which creates an envelope around all rotating parts of the decanter centrifuge, thereby eliminating the need for the motor to be mounted outside of the casket and a drive shaft to protrude through the casket to achieve the required bowl rotation. Otherwise, for example, a mechanical seal would be required to ensure the clearance between the drive shaft and casket does not allow the migration of volatile vapors to escape or undesired oxygen to enter the volatile area. However, oil pressure operated motors (also known as hydraulic motors) are very inefficient and require auxiliary cooling to remove the heat created from the pressure. Electric motors are substantially more efficient and the addition of gas-tight seals can provide a safe working area for otherwise combustible mixtures. See, for example, FIG. 8A (with an expanded view of 801 shown in FIG. 8B), where gas-tight seals (803) are employed between the housing (205 & 308) and the rotor (804) area of the centrifuge. Such seals are designed to provide gas-tight sealing up to about 760 Torr.

The design of a gas-tight decanter centrifuge allows for the liquids portion and solids portion to be recovered separately and sent to additional processes (704 & 105), while ensuring no volatiles are lost during the decanting process. Such additional processing can include such things as, for example, drier/drying processes to extract any remaining diluent contained on the solids, a dewatering zone of the wash tank, washing, additional centrifugation, filter press or membrane filtration, distillation, etc.

Delivery of the diluent, oil based drilling fluid and low gravity solids is also important to the proper operation of the gas-tight decanter centrifuge. In all cases, the fluids (containing solids) delivery system is ideally adjustable in flow, air tight, sealed and typically pressurized as well so as to result in a safe inert environment, that is, substantially free of any oxygen gas. A blending tank (704) can be used to manage process surges, and, for example, uniformly mix the diluent, oil and low gravity solids if each of the fluids are arriving from separate processes, by means of a sealed flange inlet for the diluent (402) and a sealed flange inlet for the oil and low gravity solids (404). The blending tank (704) can also be used to maintain uniformity of a mixture through an inner paddle system which is intended to keep the fluids and solids in motion, until the mixture is conveyed to the gas-tight centrifuge inlet (215) at a flow reflective of the desired separation characteristics.

Figure 13:
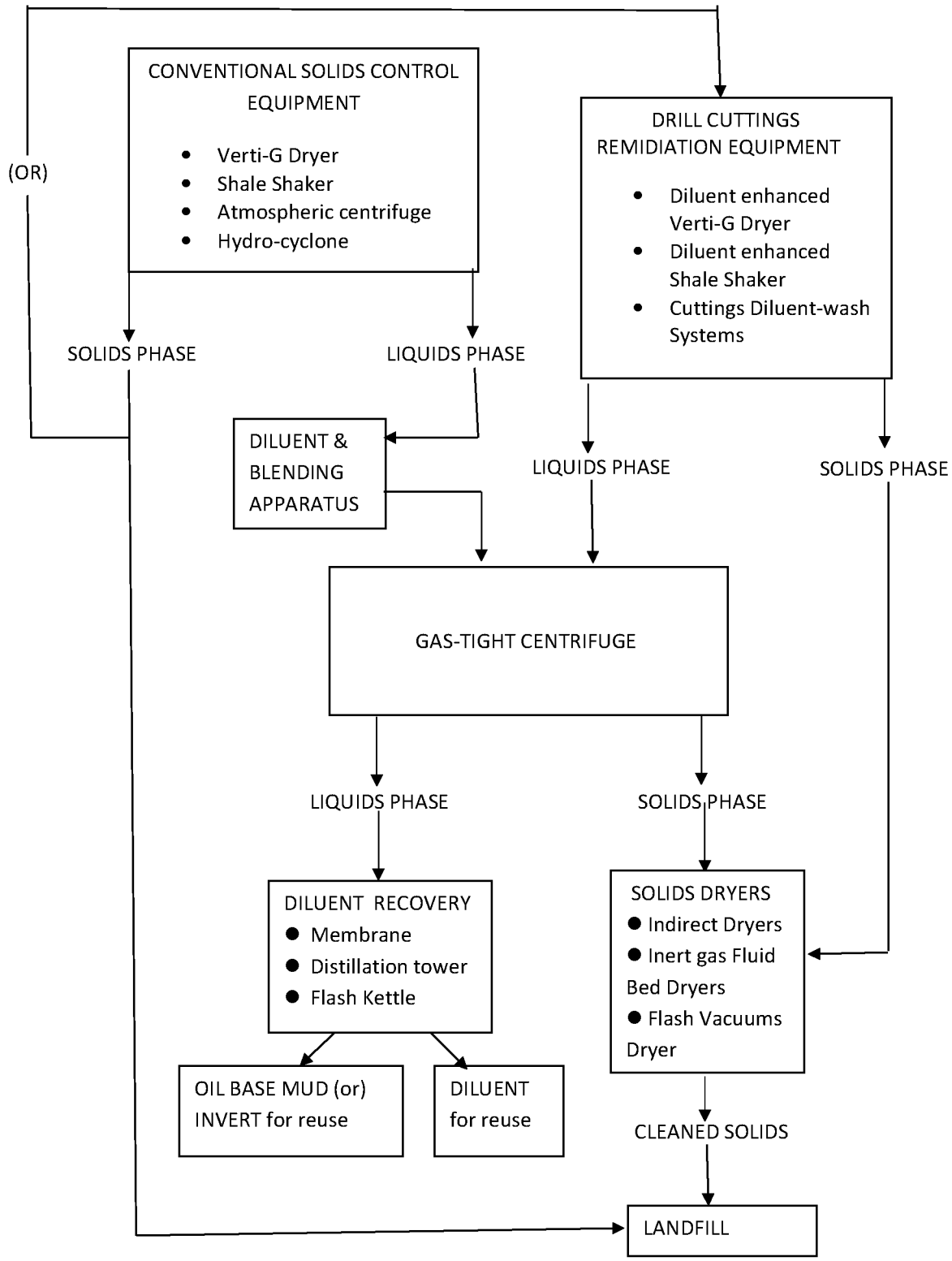
FIG. 13 depicts where a gas-tight decanter centrifuge could be employed, relative to other processes.

The oil based drilling fluid containing low gravity solids can be recovered, for example, from a conventional solids control process, and the diluent added in the blending tank, as described above, prior to low gravity solids removal in the gas-tight decanter centrifuge. Such conventional solids control processes can include such things as the liquid effluent phase as it is harvested from a Verti G drier, an atmospheric centrifuge, a shale shaker or a hydrocyclone, for example, which is then added to the blending tank as a possible feed as described above. See also, FIG. 13, for examples of the integration of the gas-tight processes described herein with other processes.

Figure 4:
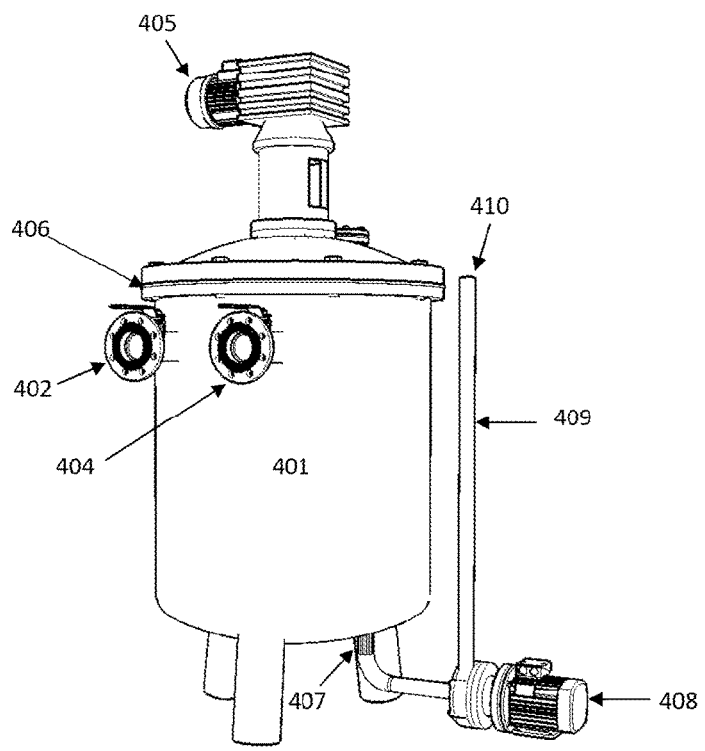
FIG. 4 is a depiction of a feed process blending tank.
Figure 5:
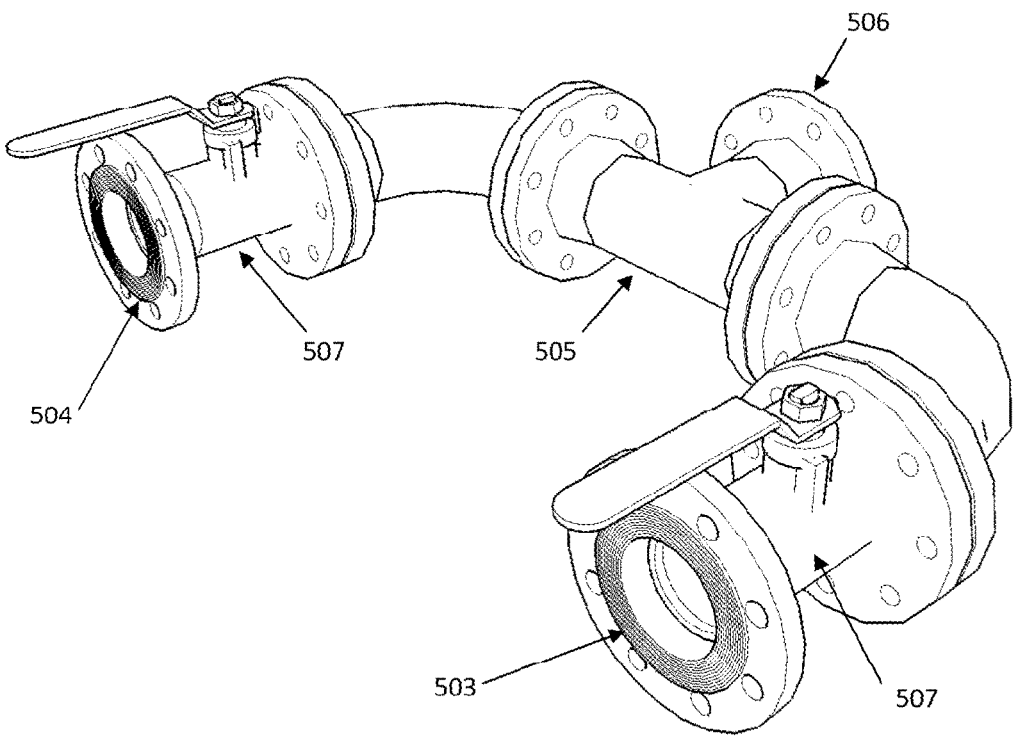
FIG. 5 is an illustration of a feed process manifold.

This type of motor driven mixing system (405) is typically mounted on the top of the blending tank (401) and the shaft of the drive equipment protrudes downward through the lid of the blending tank, sealed by means of mechanical flanges (406) and seals, into the inside of the blending tank where the paddle is submerged in the fluids and solids. The process/oil base mud/diluent inlets and outlets (402 and 404) and process outlet (407) are also shown in FIG. 4. The blending tank can also be used to transition from one operating pressure to another, by means of a positive displacement pump (408) which pulls for example from a static pressure environment and conveys the mixture to a positive pressure environment. Changes in pressure are typical when process fluids are passed through heat exchangers and the temperature of the process fluids are raised or lowered. Alternatively, if the fluids (and low gravity solids) are arriving from separate processes and uniformity of the mixture is of less importance, the separate process fluids can be passed through a manifold assembly (FIG. 5) which includes at least one sealed fluid inlet (503), or a multiple of sealed fluid inlets (and 504) (for diluent and/or oil base mud) which can be controlled by valves (507) prior to the separate process fluids mixing in a common area (505) and exiting the manifold (506) and into the gas-tight decanter centrifuge as a partially, if not fully homogenous mixture. Alternatively, the other processes utilized for washing oil based drilling fluid from drill cuttings using the addition of diluent may themselves provide adequate mixing of the fluids and solids such that only a delivery conveyor, for example, a delivery pump (705) is required. The delivery system of the process fluids is of most importance as the feed rate and concentration of the diluent, oil based drilling fluid and low gravity solids is important to proper separation of the fluids and solids. It is also important that the conduit (409) between the processes and the centrifuge be secured to the gas-tight centrifuge inlet (215) by means of a flexible conduit or coupling (410) to ensure vibration of the pump or other processes and the gas-tight decanter centrifuge are not negatively affected by vibration of one another.

In order to exploit the effectiveness of diluent additions to oil based drilling fluid, the system disclosed herein uses a gas-tight decanter centrifuge with an otherwise inert, enclosed casket section which includes a lid section, removably attached to the bottom section through a flange seal (214). The flange seal is comprised of two smooth metal surfaces which can be siliconed together, or include a rubber gasket material so that when the lid section is closed upon the bottom section, the flange section can be bolted (315) together to seal the inner atmosphere from escaping and the outer atmosphere from entering the gas-tight decanter. The inert inner atmosphere of the gas-tight centrifuge can share a common atmosphere with additional processes, the pressure of which can be monitored either at the additional processes, or at the casket itself, with a pressure monitoring device such as that of a local pressure gauge (209). The rotating shaft assembly is supported at each end through high speed pillow block bearings (204) to minimize vibration and support the high speed shaft, which supports the inner decanter bowl and auger, which turn at independent speeds of the other. The independent speeds of both rotating components are typically accomplished through a larger electric motor (211) for the bowl (commonly known as the main drive) and a smaller electric motor (212) for the auger (commonly known as the back drive).

Figure 6:
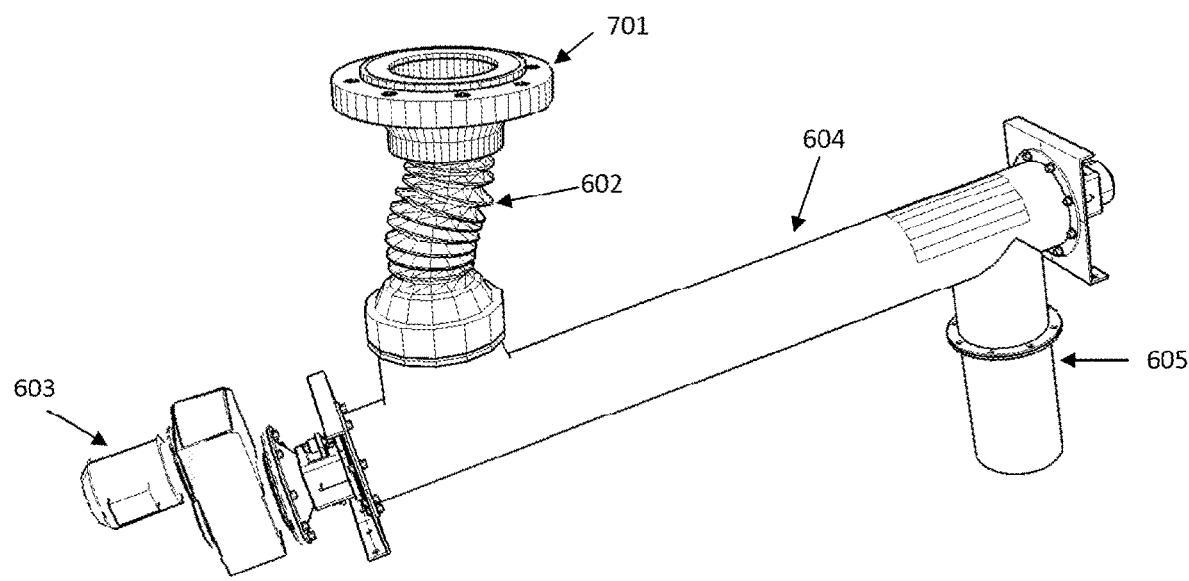
FIG. 6 is an illustration of a sealed auger, bellows and flange.
Figure 7:
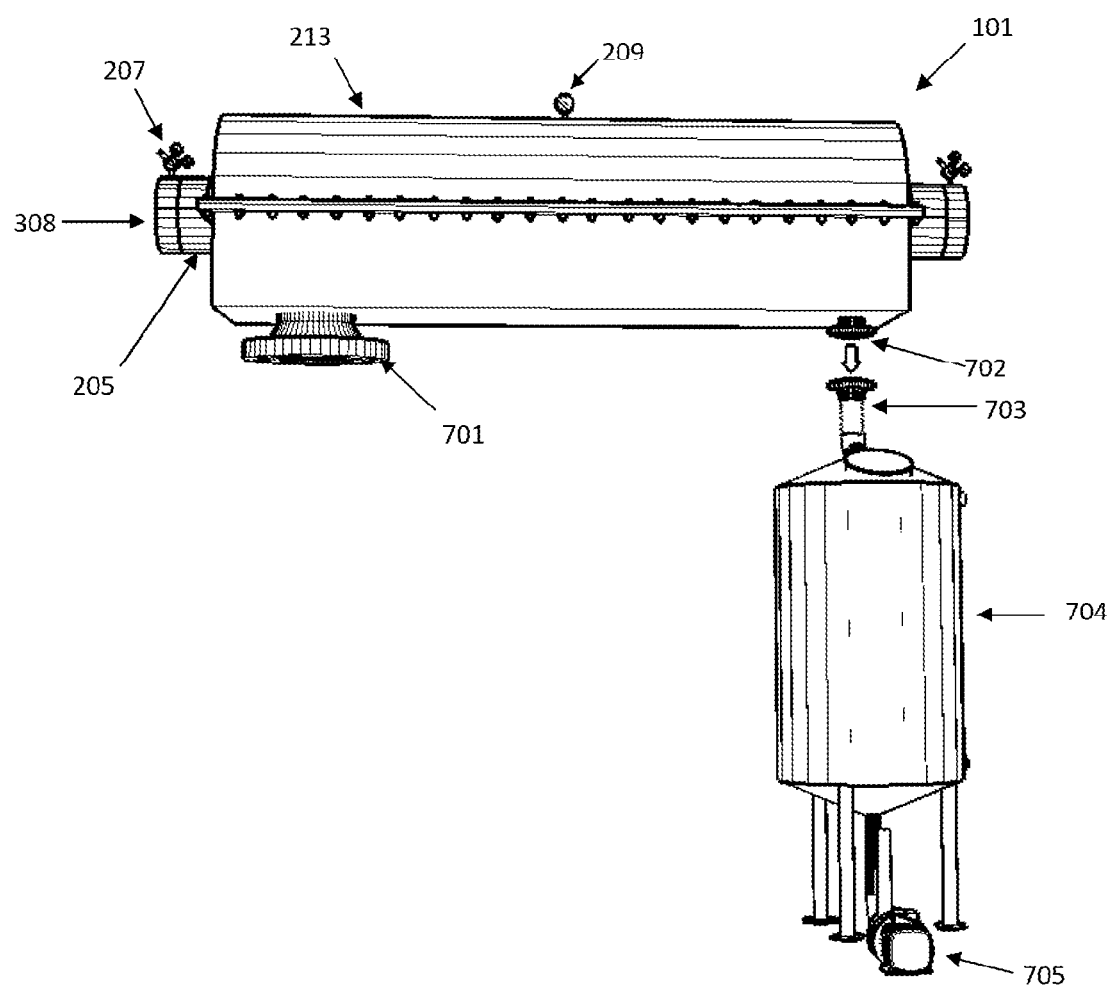
FIG. 7 is an illustration of a decanter casket, and effluent storage tank or process tank, flexible conduit and flange connection point.

The motors are typically connected to the rotating components with belts that run around pulley's, which are protected by a belt guard (210). Given the speed and weight of the rotating components within the casket (213), the gas-tight decanter centrifuge is secured to a rigid frame (202), which is connected to the gas-tight centrifuge stand (201), through vibration isolators such as spring coils or air bags (203). The rotating shaft assembly area (804) is sealed to ensure there is no exchange of gases, through multiple gaskets configured in parallel (803), between the rotating shaft assembly and the shaft sealing assembly (205). The protection of this area is abundantly important because failure of the seals (803) could result in a flammable or unstable diluent breach. Thus, the shaft sealing assembly is further protected with an inert gas assembly consisting of the housing (308), gas seals (802), an inert gas regulator (207) and an inlet (306) to the regulator for the supply gas line to couple with the regulator. The inert gas assembly (308) includes at least one seal (802) positioned to ensure inert gas remains in the sealing area, or applies positive pressure to the shaft sealing assembly (205) and seals (803), so that if the seals (803) fail, the inert gas would pass through the regulator (207) and through the sealing assemblies to the inner casket area (213). An inert atmosphere of the decanter centrifuge will prevent, for example, the possibility of an explosion or fire, which could lead to serious harm to the process, or even the operators of the processes. The non-combustible atmosphere includes a lack of oxygen present, which would otherwise be sufficient to cause an ignition of the mixture. And, as described above, the system additionally contains a solids discharge outlet (701) which includes a sealable gas-tight connection to a semi-rigid bellows or flexible conduit (602) which leads to a motor driven (603) conveyor (auger, pump, belt conveyor) (604) so that the recovered low gravity solids can be evacuated to at least one additional process (through conduit 605, for example) while simultaneously allowing for vibration isolation from the centrifuge to said at least one additional process (105) by means of the conveyor (shown in FIG. 6), or from said at least one additional process (102) to the centrifuge (101), and fluid flow communication of the common inert atmosphere through the gas-tight flanged connections (701 & 702).

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of removing low gravity solids from recovered oil based drilling fluid comprising:
    mixing the low gravity solids containing drilling fluid with a diluent; and
    processing the mixture in a gas-tight decanter centrifuge to produce effluent and separated low gravity solids,
    wherein the centrifuge is sealed so as to prevent escape of vapors from the mixture into the atmosphere and the introduction of atmospheric oxygen into the gas-tight decanter centrifuge, and
    wherein the gas-tight decanter centrifuge additionally contains a solids discharge outlet including a sealable gas-tight connection to a semi-rigid bellows or flexible conduit which leads to a conveyor so that the recovered low gravity solids can be evacuated to at least one additional process while simultaneously allowing for vibration isolation from the centrifuge to said at least one additional process, or from said at least one additional process to the centrifuge, including fluid flow communication of the common non-combustible or inert atmosphere with the conveyor.

2. The method of claim 1, wherein the diluent has a vapour pressure between about 0.1 Torr and about 760 Torr when measured at 20° C.

3. The method of claim 1, wherein the diluent has a flash point less than or equal to 37° C.

4. The method of claim 1, wherein the diluent has a vapour pressure between about 0.1 Torr and about 760 Torr when measured at 20° C., and a flash point less than or equal to 37° C.

5. The method of claim 1, wherein the processing is run at an internal pressure of up to about 760 Torr.

6. The method of claim 1, wherein the mixture has a vapour pressure equal to or greater than 0.1 Torr and less than 760 Torr and the mixture has a flash point equal to or less than 37° C.

7. The method of claim 1, wherein the diluent and the recovered oil based drilling fluid are blended prior to introduction into the gas-tight decanter centrifuge.

8. The method of claim 7, wherein the diluent and the recovered oil based drilling fluid are blended in a chemical wash processing tank prior to introduction into the gas-tight decanter centrifuge.

9. The method of claim 7, wherein the diluent and the recovered oil based drilling fluid are blended in a manifold prior to introduction into the gas-tight decanter centrifuge.

10. The method of claim 1, wherein the oil based drilling fluid containing low gravity solids has been recovered by a solids control process, and diluent is added to achieve low gravity solids removal in a gas-tight decanter centrifuge.

11. The method of claim 1, wherein the oil based drilling fluid, low gravity solids and diluent are introduced into the gas-tight decanter centrifuge at a controlled rate and the centrifuge is operated at a less than its designed hydraulic loading capacity so as to produce less than 1% by volume low gravity solids in the effluent.

12. The method of claim 1, wherein the diluent and recovered oil based drilling fluid containing low gravity solids are at any level of homogeneity or uniformity as the mixture is moved into the gas-tight decanter centrifuge.

13. A method for removing low gravity solids from a mixture of recovered oil based drilling fluid containing low gravity solids and a volatile organic compound containing diluent, the method comprising:
    mixing the low gravity solids containing drilling fluid with a diluent; and
    processing the mixture in a gas-tight decanter centrifuge that is designed and constructed in a gas-tight manner to ensure transient volatile organic compounds cannot escape the decanting process, and foreign oxygen cannot enter the process under normal operating conditions,
    wherein the gas-tight decanter centrifuge includes a liquids discharge outlet which includes a sealable gas-tight connection to a semi-rigid bellows or flexible conduit which allows for vibration isolation between the gas-tight decanter centrifuge and at least one processing device that is in fluid communication with the liquids discharge outlet.

14. The decanting process of claim 13, wherein the at least one processing device is configured for a solids drying, solids washing, distillation and/or filtration process.

15. The method of claim 1, wherein the conveyor is an auger, pump, or belt conveyor.

16. The method of claim 1, additionally containing a liquids discharge outlet which includes a sealable gas-tight connection to a semi-rigid bellows or flexible conduit which allows for vibration isolation between the gas-tight decanter centrifuge to at least one additional process or from the at least one additional process to the centrifuge, including fluid flow communication between the recovered liquids and a pump inlet or holding tank with the centrifuge.

* * * * *